_United States Patent_ [19]

Deschamps et al.

[11] Patent Number: 4,725,417

[45] Date of Patent: Feb. 16, 1988

[54] PROCESS FOR REMOVING SULFUR OXIDES FROM A GAS BY MEANS OF AN ABSORPTION MASS REGENERABLE BY REACTION WITH HYDROGEN SULFIDE

[75] Inventors: André Deschamps, Noisy Le Roi; Claude Dezael, Maisons Laffitte; Michel Roussel, Antony, all of France

[73] Assignee: Institut Francais du Petrole, Rueil-Malmaison, France

[21] Appl. No.: 906,485

[22] Filed: Sep. 12, 1986

[30] Foreign Application Priority Data

Sep. 13, 1985 [FR] France ................... 85 13727

[51] Int. Cl.$^4$ ................... B01J 8/00; C01B 17/00
[52] U.S. Cl. ................... 423/244; 423/573 G; 423/574 R; 423/638
[58] Field of Search .......... 423/242 A, 242 R, 244 A, 423/244, 638, 573 G, 574 R

[56] References Cited

U.S. PATENT DOCUMENTS

| | | | |
|---|---|---|---|
| 3,755,535 | 8/1973 | Naber | 423/244 |
| 3,957,952 | 5/1976 | Naber et al. | |
| 4,011,299 | 3/1977 | Henis et al. | 423/244 |
| 4,241,033 | 12/1980 | Ginger et al. | |
| 4,399,112 | 8/1983 | Voirin | 423/244 X |
| 4,492,678 | 1/1985 | Yoo et al. | 423/244 |
| 4,529,574 | 7/1985 | Wang | 423/244 |

FOREIGN PATENT DOCUMENTS

| | | |
|---|---|---|
| 2090554 | 1/1972 | France . |
| 2222128 | 10/1974 | France . |
| 2279454 | 2/1976 | France . |
| 2373323 | 7/1978 | France . |
| 1089716 | 11/1967 | United Kingdom . |
| 1511911 | 5/1978 | United Kingdom . |

_Primary Examiner_—Gregory A. Heller
_Attorney, Agent, or Firm_—Millen & White

[57] ABSTRACT

The invention concerns a process for removing sulfur oxides and particularly sulfur dioxide contained in such gases as industrial fumes, wherein said gas is contacted with a solid absorbent containing magnesium oxide and at least one group VIII noble metal, in such conditions that the sulfur oxides are mainly fixed as magnesium sulfate, and then the used solid absorbent is regenerated by contact with a hydrogen sulfide-containing reducing gas.

21 Claims, 1 Drawing Figure

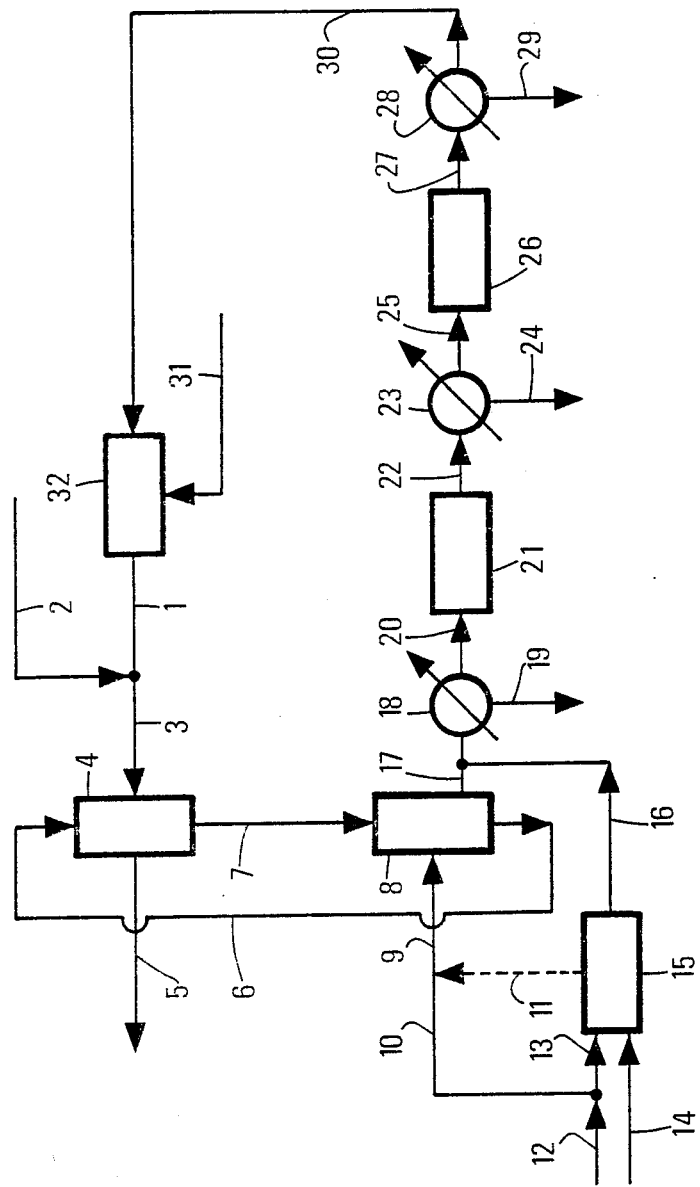

PROCESS FOR REMOVING SULFUR OXIDES FROM A GAS BY MEANS OF AN ABSORPTION MASS REGENERABLE BY REACTION WITH HYDROGEN SULFIDE

The invention concerns a process for removing sulfur oxides, mainly sulfur dioxide, contained in gases such as industrial fumes, characterized in that the gas is contacted with a solid absorbent containing magnesium oxide and at least one noble metal from group VIII, in such conditions as to fix the sulfur oxides, mainly as magnesium sulfate, and then the used solid absorbent is regenerated by contact with a hydrogen sulfide-containing reducing gas.

According to a particular embodiment of the invention, the steps of collecting sulfur oxides and of regenerating the solid are integrated with a Claus unit so as to finally convert said sulfur oxides to elemental sulfur by reaction with hydrogen sulfide.

BACKGROUND OF THE INVENTION

The removal of sulfur oxides and of nitrogen oxides contained in industrial effluents is of increasing importance, particularly in view of acid rain phenomena which are highly detrimental to the environment in industrialized countries and countries proximate thereto.

The main sources of these polluting emissions are the fumes from thermal power plants, industrial furnaces and heaters as well as the effluents from various chemical and refining plants: units for manufacturing sulfuric acid, for calcination of ores, Claus units, catalytic cracking units . . .

Many processes for purifying these effluents have already been proposed and some of them are industrially used but they all have some disadvantages.

Thus the processes of the wet type, using aqueous solutions or suspensions of carbonates, hydroxides or sulfites of alkali or alkaline-earth metals or of ammonium, have the disadvantage of requiring the cooling of the fumes and their subsequent re-heating before discharge to the atmosphere. Moreover, the formed products—sulfites and sulfates—raise problems of waste disposal for processes with external discharge, or of a high cost of treatment for processes with regeneration.

The processes of the dry type, using limestone or dolomite, have also the problem of by-products discharge and generally suffer from insufficient performances.

Some processes of the dry type, using regenerable solid absorbents, have also been proposed. Most of them, as the process with alkalinized alumina (U.S. Pat. No. 2,992,884) or the process with copper oxide (U.S. Pat. No. 3,778,501), require the use of such reducing gases as hydrogen or a mixture of hydrogen with carbon monoxide to regenerate the absorbent. These techniques have the disadvantage of consuming expensive reducing gases, which strongly affects their economy.

The use of regenerable desulfurizing masses, consisting essentially of alumina and oxides of alkaline-earth metals, mainly magnesium oxide, is also disclosed in a series of patents concerning the reduction of sulfur oxides emissions from catalytic cracking units. These solid absorbents, admixed to or deposited on the catalytic cracking catalyst, retain as sulfates the sulfur oxides formed during the combustion of the coke deposited on the catalyst and are regenerated in the cracking step by reaction with the present hydrocarbons, with formation of hydrogen sulfide.

U.S. Pat. No. 3,855,031 may be considered as the basic patent in this field. Many patents of improvement, as FR Pat. No. 2,512,050 and U.S. Pat. Nos. 4,240,899 and 4,300,997, claim an improvement in collecting sulfur oxides by these absorbents consisting of incorporating therewith small amounts of compounds of group VIII noble metals or rare earths, acting in particular as promoters of the oxidation of sulfur dioxide to sulfur trioxide. The mere principle of this technique limits its application to the reduction of sulfur oxides emissions from catalytic cracking units.

Another patent family discloses masses absorbing sulfur oxides, containing mainly metal oxides regenerable by reaction with hydrogen sulfide. Thus, U.S. Pat. No. 3,755,535 claims the use of absorbents having aluminum oxide and/or magnesium oxide as main constituents for removing only sulfur trioxide. U.S. Pat. No. 4,426,365 discloses the use of alumina containing alkali or alkaline-earth metal oxides for removing nitrogen oxides and optionally sulfur oxides at a temperature of 85°–200° C. However, in these conditions, the efficiency of the sulfur dioxide removal is very limited, particularly with so-called regenerated absorbents and no performance rate is given for magnesium oxide U.S. Pat. No. 4,283,380 states the difficulty of regenerating, by reduction with hydrogen sulfide, absorbents mainly consisting of alkalized aluminas, by specifically claiming aluminas free of alkaline substances. Unhappily the reaction velocity of sulfur oxides, particularly sulfur dioxide, with such absorbents is low.

SUMMARY OF THE INVENTION

The present invention concerns the use, for removing sulfur oxides and more particularly sulfur dioxide contained in fumes, of absorbent masses containing magnesium oxide and at least one compound of group VIII noble metal, combined with a regeneration of these absorbents by reaction with hydrogen sulfide.

As a matter of fact, it has been discovered that group VIII noble metals, particularly platinum and palladium, act not only as promoters for the collection of sulfur dioxide by magnesium oxide-containing solid absorbents, but also as catalysts for the reduction of magnesium sulfate by hydrogen sulfide in order to regenerate magnesium oxide. A preferred embodiment of the invention concerns a process for removing sulfur oxides, particularly sulfur dioxide, contained in industrial fumes also containing oxygen, which is characterized by the steps of:

(a) contacting the fume at a temperature of 350°–750° C. with a solid absorbent containing magnesium oxide and at least one group VIII noble metal or compound thereof preferably platinum and/or palladium, so as to absorb said sulfur oxides, mainly as magnesium sulfate, (b) then seperating from the fume the solid absorbent and regenerating it by, contact with a hydrogen sulfide-containing regenerating gas stream, at a temperature of 350°–750° C., and (c) finally separating the regenerated solid absorbent from the regenerating gas and re-using it for sulfur oxides absorption.

The present invention provides for a substantial improvement in the technique of fumes desulfurization by means of magnesium oxide-containing solid absorbents, known in the prior art. On the one hand, it provides for a much more efficient regeneration of said absorbents by using an inexpensive reducing gas, i.e. hydrogen sulfide. On the other hand, it makes possible a regeneration at lower temperature which improves the absorbents life time, reduces the corrosion and the power expense. The resultant process for removing sulfur oxides from fumes is hence more efficient and more economical.

The solid absorbents useful according to the invention contain magnesium oxide as compound chemically active with respect to sulfur oxides and at least one promoter selected from group VIII noble metals or compounds thereof, preferably platinum and palladium. Magnesium oxide and the one or more promoters are preferably associated with a binder, a textural agent or a mineral porous carrier and shaped as balls, extrudates or pellets.

These absorbents may be produced by using for most part the known methods for preparing catalysts. For example a mixture of powdered magnesium oxide with one or more noble metal compounds may be agglomerated by means of mineral binders such as kaolin, montmorillonite or attapulgite. Magnesium hydroxide or carbonate may also be precipitated in the presence of a textural promoter such as alumina or silica, then the solid is shaped and impregnated with a solution of one or more group VIII metal compounds. Also methods of coprecipitating magnesium hydroxide or carbonate and the textural agent, particularly alumina, can be used. After roasting, a mixed oxide of spinel type is obtained to which the one or more group VIII metals are added by impregnation. Finally, the magnesium oxide, and the one or more group VIII metal compounds may be incorporated with a preformed porous carrier, by impregnation with precursor salts. This method is generally preferred.

Examples of such carriers are refractory inorganic oxides such as alumina, silica, silica-aluminas, zirconium and titanium oxides, mixed oxides of the spinel type, particularly of magnesium and aluminum. They have a specific surface generally ranging from 10 to 300 m$^2$/g, preferably from 20 to 150 m$^2$/g. A preferred method for preparing the absorbent is described hereinafter:

The carrier is impregnated in a first step with an aqueous solution of a magnesium salt precursor of magnesium oxide, such as, for example, magnesium nitrate, acetate, citrate, dried in a stove at 100°–150° C. and then roasted at 400°–700° C. to decompose the salt to oxide. This operation may be repeated so as to introduce the desired amount of magnesium oxide. In a second step, the one or more group VIII metals are incorporated by impregnation with an aqueous solution of such a compound as chloroplatinic acid or palladium chloride.

The magnesium oxide content of the absorbent may vary within a wide range of, for example, 1 to 50% by weight. It is preferably of 2–30% by weight. The group VIII metals content is generally from 5 to 20,000 ppm (parts per million of parts) by weight and preferably from 10 to 1,000 ppm.

A preferred absorbent is formed essentially of alumina and magnesium oxide, the magnesium oxide content being from 1 to 50% by weight, preferably from 2 to 30% by weight.

A preferred operating method is described hereinafter:

The step of sulfur oxides absorption is performed by contacting sulfur oxides-and oxygen-containing fumes with the absorbent at a temperature from 350° to 750° C., preferably from 400° to 650° C. The oxygen content is generally from 1 to 10% by volume, preferably 2–6% by volume and is at least equal to one mole of oxygen per mole of sulfur dioxide. The space velocity (volume of gas, measured at normal temperature and pressure conditions, per volume of absorbent and per hour) is generally from 200 to 5,000, h$^{-1}$ preferably from 500 to 3,000 h$^{-1}$.

When the absorbent is charged with sulfur oxides in a proportion ranging, for example, from 0.1 to 1 mole of sulfur oxides per mole of magnesium oxide, it is subjected to a regeneration step performed by contact with a gas containing at least 1% of hydrogen sulfide, at a temperature of 350°–750° C., preferably 400°–600° C., for a sufficient time to recover the most part of its initial sulfur oxides absorption capacity. This contact time depends on many parameters, particularly the magnesium sulfate concentration of the absorbent, the temperature, the hydrogen sulfide concentration and the flow rate of regenerating gas. Generally, these conditions are so selected as to limit the contact time within the range of 0.2 to 15 hours.

For the regeneration, at least one half mole of hydrogen sulfide is preferably used per mole of magnesium sulfate. Although this regeneration step can be performed under pressure, it is generally preferred to proceed at about atmospheric pressure. The gas effluent from the regeneration step contains sulfur dioxide and elemental sulfur originating from the reaction of magnesium sulfate with hydrogen sulfide.

The absorbent, in the step of collecting sulfur oxides as well as in the regeneration step, can be used in fixed bed, moving bed or fluidized bed form.

The process object of the invention can be used for the treatment of any gas or fume containing sulfur oxides and oxygen, for example fumes from thermal power plants, industrial furnaces and heaters, units for manufacturing sulfuric acid, for calcination of ores, Claus units, and units for regenerating catalytic cracking catalysts.

However the use of the process is more advantageous on the sites where hydrogen sulfide is available. It is then convenient to combine the fume treatment unit with the Claus unit providing for the conversion of hydrogen sulfide to element sulfur. By this combination, the gas effluent from the regeneration step can be treated to convert also to sulfur the sulfur oxides removed from the fumes.

BRIEF DESCRIPTION OF THE DRAWING

The accompanying drawing is a flow sheet showing an example of combination of the process of the invention with a Claus unit.

The Claus unit tail gas, originating from incinerator 32 through line 1, is optionally admixed with other fumes containing sulfur oxides, fed through line 2. The mixture is fed, through line 3, to the sulfur oxides absorber 4 where it is contacted with the solid absorbent supplied through line 6. The fumes, freed of sulfur oxides, are discharged through line 5, whereas the solid, charged with sulfur oxides, is conveyed through line 7 to regenerator 8. It is regenerated by contact with a hydrogen sulfide-containing gas stream, fed through line 9. This gas stream is supplied through lines 10 and 11. The flow 10 consists of an "acid gas", relatively cold, of high H$_2$S content, withdrawn form the Claus unit feeding line 12. The relatively hot flow 11, of lower H$_2$S content, is withdrawn from the Claus unit thermal stage 15. It represents a part of the gases obtained by partial oxidation of the "acid gas" remainder of high H₂S content fed through line 13 with air supplied from line 14 to the thermal stage 15. By this device the temperature and the H₂S content of the regeneration gas 9 can be simultaneously adjusted. This gas may comprise 0–100% of gas 10 (hence 100–0% of gas 11), preferably 10–90% of gas 10 (and accordingly 90–10% of gas 11).

The regenerated solid absorbent is fed back to sulfur oxides absorber 4 through line 6. The gas effluent 17 from regenerator 8 is admixed with the gas remainder flowing from thermal stage 15 through line 16. The mixture is cooled in exchanger-condenser 18 and divided into a stream of liquid sulfur 19 and a gas stream 20 which is introduced into the first catalytic stage 21 of the Claus unit. The gas effluent 22 is cooled in the exchanger-condenser 23 and divided into a liquid sulfur flow 24 and a gas flow 25 which is supplied to the second catalytic stage 26 of the Claus unit. The gas effluent 27 is cooled in the exchanger-condenser 28 and divided into a liquid sulfur flow 29 and a gas flow 30 containing no more than small amounts of H₂S, SO₂ and elemental sulfur. This gas stream is introduced, together with air supplied through line 31, into the incinerator 32 which converts the residual sulfur compounds to sulfur dioxide. Thus the sulfur oxides removed from the fumes are converted to elemental sulfur by reaction with hydrogen sulfide.

EXAMPLES

The following examples are given to illustrate the invention but must not be considered as limiting the scope thereof.

Example 1

An absorbent A is prepared by impregnating 100 g of activated alumina of 130 m²/g specific surface, available as balls of a diameter ranging from 2 to 4 mm, with 100 cc of a solution containing 70 g of magnesium nitrate Mg(NO₃)₂, 6H₂O. The impregnated solid is dried in stove at 120° C. for 6 hours, at 200° C. for 12 hours and then roasted at 600° C. for 2 hours. 111 g of absorbent A are thus obtained whose magnesium oxide content by weight is about 10%.

Example 2

An absorbent B is prepared by repeating the preparation of example 1 and then further impregnating the solid with 100 cc of a chloroplatinic acid solution containing 55 mg/l of platinum. The absorbent obtained after drying and roasting contains about 10% by weight of magnesium oxide and 50 ppm by weight of platinum.

Example 3

An absorbent C is prepared by repeating the preparation of Example 1 and then further impregnating the solid with 100 cc of an aqueous solution of palladium chloride. The absorbent C obtained after drying and roasting contains about 10% by weight of magnesium oxide and 50 ppm by weight of palladium.

Example 4

100 cc (about 55.5 g) of absorbent are placed in a quartz tube of 3 cm inner diameter and 50 cm length, heated to a regulated temperature by means of a tubular furnace. At the top of the reactor is introduced, at a rate of 100 Nl/h, a reconstituted fume having the following composition:

|  | N₂ | CO₂ | H₂O | O₂ | SO₂ | SO₃ |
|---|---|---|---|---|---|---|
| Volume % | 75.75 | 10 | 10 | 4 | 0.24 | 0.01 |

The reactor gas effluent is continuously analyzed for determining its sulfur oxides (SO₂+SO₃) content. When the loss of sulfur oxides in the output gas reaches 100 ppm by volume, the fume supply is discontinued and the absorbent regenerated by introducing at the top of the reactor a gas mixture formed of 27 Nl/h of nitrogen and 3 Nl/h of hydrogen sulfide.

After 3 hours, the supply of hydrogen sulfide-containing gas is discontinued, the reactor is purged with nitrogen for 5 minutes and sulfur dioxide-containing fume is again introduced on the regenerated absorbent.

Thus 20 cycles of SO₂ collection-regeneration with A, B and C absorbents of Examples 1, 2 and 3 are performed.

After the 20th regeneration, each absorbent is weighed and its weight compared with its initial weight. The solid weight variation is used to evaluate its regeneration degree (a zero weight variation indicating a complete regeneration). The absorbent efficiency for removing sulfur oxides is evaluated from the duration of the collection step wherein the sulfur oxides (SOx) loss is lower than 50 ppm by volume. The results of these comparative tests are reported in the table hereinafter.

These results show that B and C absorbents, respectively containing 50 ppm by weight of platinum and 50 ppm by weight of palladium, not only have an initial efficiency for removing SOx much higher than that of absorbent A, not containing them, but, in addition, are much more easily regenerated by reaction with hydrogen sulfide.

In the present process, the total oxygen molar amount used for the Claus reaction (32) and the partial combustion of relatively cold gas of high H₂S content (15) is preferably substantially equal (with ±5% approximation) to (A−3B)/2, A being the H₂S molar feed rate at the unit input and B the SO₂ molar flow rate in the gas treated by the process.

TABLE

| Absorbent | A | | B | | C | |
|---|---|---|---|---|---|---|
| Temperature of the collection step °C. | 500 | 600 | 500 | 600 | 500 | 600 |
| Temperature of the regeneration step °C. | 500 | 600 | 500 | 600 | 500 | 600 |
| Duration of the collection step in hours with a loss of SOx < 50 ppm vol | | | | | | |
| 1st collection | 3.1 | 5.3 | 11.5 | 11.6 | 11 | 11.2 |
| 2nd collection | 0.6 | 4 | 11.3 | 11.5 | 10.7 | 11 |
| 10th collection | 0.4 | 3 | 11 | 10.5 | 10.4 | 9.9 |
| 20th collection | 0.3 | 2.2 | 10.9 | 10.1 | 10.3 | 9.7 |
| Variation of the absorbent weight in g | +2.6 | +2.4 | +0.05 | +0.05 | +0.1 | +0.05 |

What is claimed as the invention is:

1. A process for removing sulfur dioxide from a gas containing the same, characterized by a first step of contacting said gas with a solid absorbent containing 1-50% by weight of magnesium oxide and 5-20,000 ppm of at least one noble metal or compound of a noble metal from group VIII, in the presence of oxygen, and by a second step of contacting the absorbent with a hydrogen sulfide-containing gas, so as to regenerate it wherein said noble metal or compound of a noble metal being present in said adsorbent to catalyze regeneration by said hydrogen sulfide-containing gas.

2. A process according to claim 1, wherein the first and the second steps are conducted at a temperature of 350°-750° C.

3. A process according to claim 1, wherein said at least one noble metal is platinum or palladium.

4. A process according to claim 1, wherein the absorbent consists essentially of alumina, magnesium oxide and at least one noble metal from Group VIII.

5. A process according to claim 1, wherein the magnesium oxide content is from 2 to 30% by weight.

6. A process according to claim 1, wherein the absorbent is obtained by impregnating an alumina of a surface from 10 to 300 $m^2/g$ with an aqueous solution of a magnesium salt, drying, roasting at 400°-700° C., and then impregnating with an aqueous solution of a platinum and/or palladium compound.

7. A process according to claim 1, wherein the gas contains 1 to 10% by volume of oxygen, the oxygen proportion being of at least one mole per mole of sulfur dioxide, and the first step is continued until 0.1 to 1 mole of sulfur oxides per mole of magnesium oxide has been absorbed.

8. A process according to claim 1, wherein the sulfur dioxide-containing gas treated by the process is a residual gas from the conversion, by Claus reaction, of a hydrogen sulfide-containing gas and wherein the gas of the regeneration step is also treated by Claus reaction in admixture with said hydrogen sulfide-containing gas subjected to said reaction.

9. A process according to claim 8, wherein the hydrogen sulfide-containing gas consists of 10-90% by volume of a relatively cold gas of high hydrogen sulfide content and 90-10% by volume of a relatively hot gas resulting from the partial combustion of a portion of said relatively cold gas of high hydrogen sulfide content.

10. A process according to claim 8, wherein the total oxygen molar feed rate used for the Claus reaction and for said partial combustion is substantially equal, with a ±5% approximation, to $(A-3B)/2$, A being the hydrogen sulfide molar feed rate at the unit input and B the molar flow rate of sulfur dioxide contained in the gas treated by the process.

11. A process according to claim 1, wherein said first step is conducted at a temperature of 350°-750° C.

12. A process according to claim 1, wherein said first step is conducted at a temperature of 400°-650° C.

13. A process according to claim 1, wherein said second step is conducted at a temperature of 350°-750° C.

14. A process according to claim 1, wherein said second step is conducted at a temperature of 400°-600° C.

15. A process according to claim 1, wherein said absorbent contains 5-20,000 ppm by weight of said noble metal from group VIII.

16. A process according to claim 1, wherein said absorbent contains 10-1,000 ppm by weight of said noble metal of group VIII.

17. A process according to claim 1, wherein said gas contains at least 1 mole of oxygen per mole of sulfur dioxide.

18. A process according to claim 1, wherein said first step is performed within an absorber containing a bed of said solid absorbent and said gas is conducted through said absorber at a gaseous hourly space velocity of 200-5,000 $h^{-1}$.

19. A process according to claim 1, wherein said first step is performed within an absorber containing a bed of said solid absorbent and said gas is conducted through said absorber at a gaseous hourly space velocity of 500-3,000 $h^{-1}$.

20. A process according to claim 1, wherein said sulfur dioxide is absorbed onto the absorbent in the form of magnesium sulfate and during regeneration of said absorbent said magnesium sulfate reacts with hydrogen sulfide to form sulfur dioxide and elemental sulfur.

21. A process for removing sulfur oxides from a gas comprising,
(a) contacting a gas containing $SO_2$, $SO_3$, or mixtures thereof with a solid absorbent, said solid absorbent containing 1-50% by weight of magnesium oxide and 5-20,000 ppm of at least one noble metal or compound of a noble metal from group VIII, said contacting being conducted in the presence of oxygen, and
(b) regenerating said solid absorbent by contacting said absorbent with a hydrogen sulfide-containing gas wherein said noble metal or compound of a noble metal being present in said adsorbent to catalyze regeneration by said hydrogen sulfide-containing gas.

* * * * *